United States Patent Office 3,334,238
Patented Aug. 1, 1967

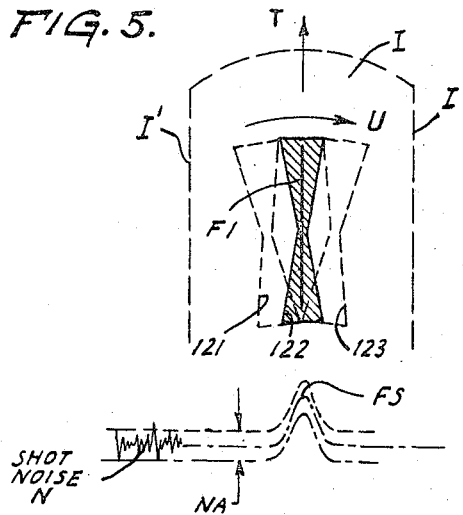
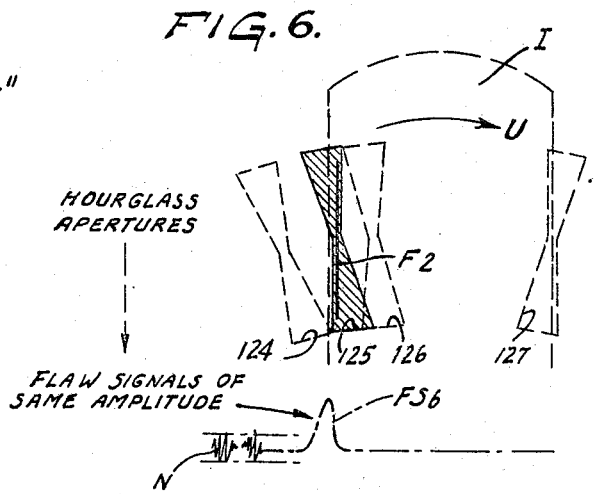
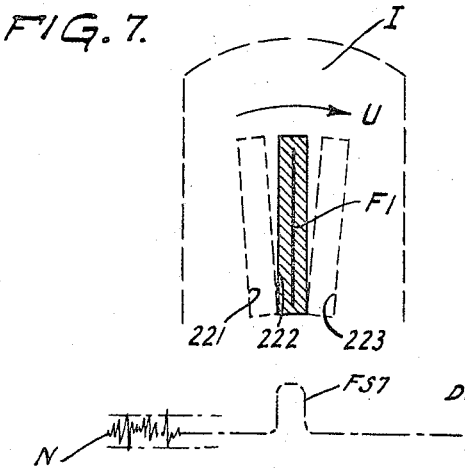
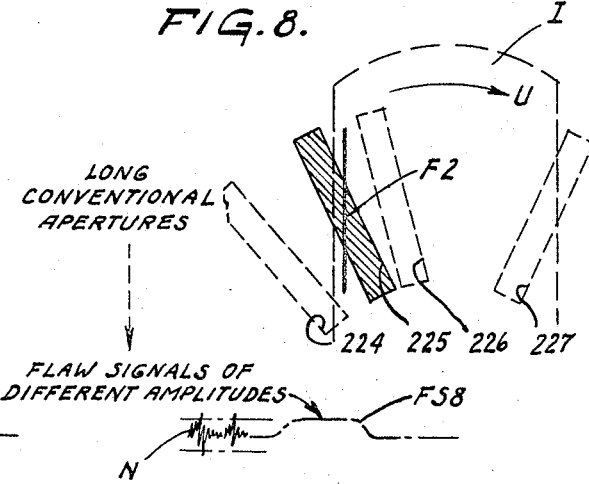
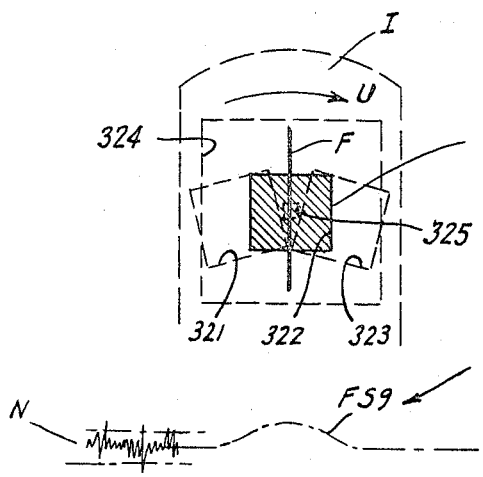

3,334,238
PHOTOELECTRIC INSPECTION SYSTEM FOR THE DISCOVERY OF FLAWS IN ROLLED STOCK AND THE LIKE
John J. Heimbold, Rochester, N.Y., assignor to Philco-Ford Corporation, a corporation of Delaware
Filed June 9, 1964, Ser. No. 373,692
13 Claims. (Cl. 250—219)

ABSTRACT OF THE DISCLOSURE

Apparatus for inspecting elongate objects, traveling in a longitudinal direction, and particularly for detecting flaws or scratches in rolled stock. Substantially straight-sided generally hourglass-shaped inspection windows are provided in a scanning disc overlying the traveling objects. Electronic inspection of the traveling objects, through these windows, suppresses noise which is otherwise caused by photoelectric shot effects, and thereby maximizes the signal effect of the flaws.

*Background, nature and object of the invention*

This invention relates to apparatus for automatically inspecting certain processes and products. It serves particularly to detect scratches, veins and similar flaws or marks of materials mass-fabricated by rolling processes and the like.

It has of course been proposed to use photoelectric apparatus for determinations of this kind, but serious difficulties were encountered. Problems arose particularly when attempts were made photoelectrically to detect relatively small defects and when the materials had to be observed in rapid motion. In such cases it was often impossible to maintain a proper ratio of flaw-indicating "signals" to unavoidable "noise." This difficulty was due not only to random noises occasioned by the working conditions of fabricating plants, but was also due to a noise problem inherently caused by the photoelectric process. This latter problem is connected with electronic phenomena collectively known as "shot effects."

Such effects are present in the output of all thermionic and photoelectric tubes. The electronic noise created thereby can be disturbing, particularly when the flaws to be detected are small or indistinct and when the flaw signals therefore are weak. As a result it was often impossible, with devices hitherto available, unambiguously to distinguish the flaw signals from the noise. My invention has the object to alleviate or overcome this fundamental problem.

In connection with this object the invention provides a photoelectric detector with novel scanning apparatus, characterized by the use of peculiar apertures. In a preferred embodiment of the invention each aperture has the shape of a narrow hourglass, and the apertures are distributed over a scanning disc at angular distances peculiarly related to their shape. The details will be understood from the drawing appended hereto, and from the description thereof which follows.

*Description of the drawing and of the preferred embodiment*

In the drawing FIGURE 1 is a perspective view of the preferred embodiment of the invention.

FIGURES 5 and 6 are fragmentary, diagrammatic plan views, drawn on a scale between those of FIGURES 3 and 4, and also showing output signals of the apparatus. FIGURES 7 to 9 are similar representations, based however on the use of conventional shutter apertures.

Figure 1:
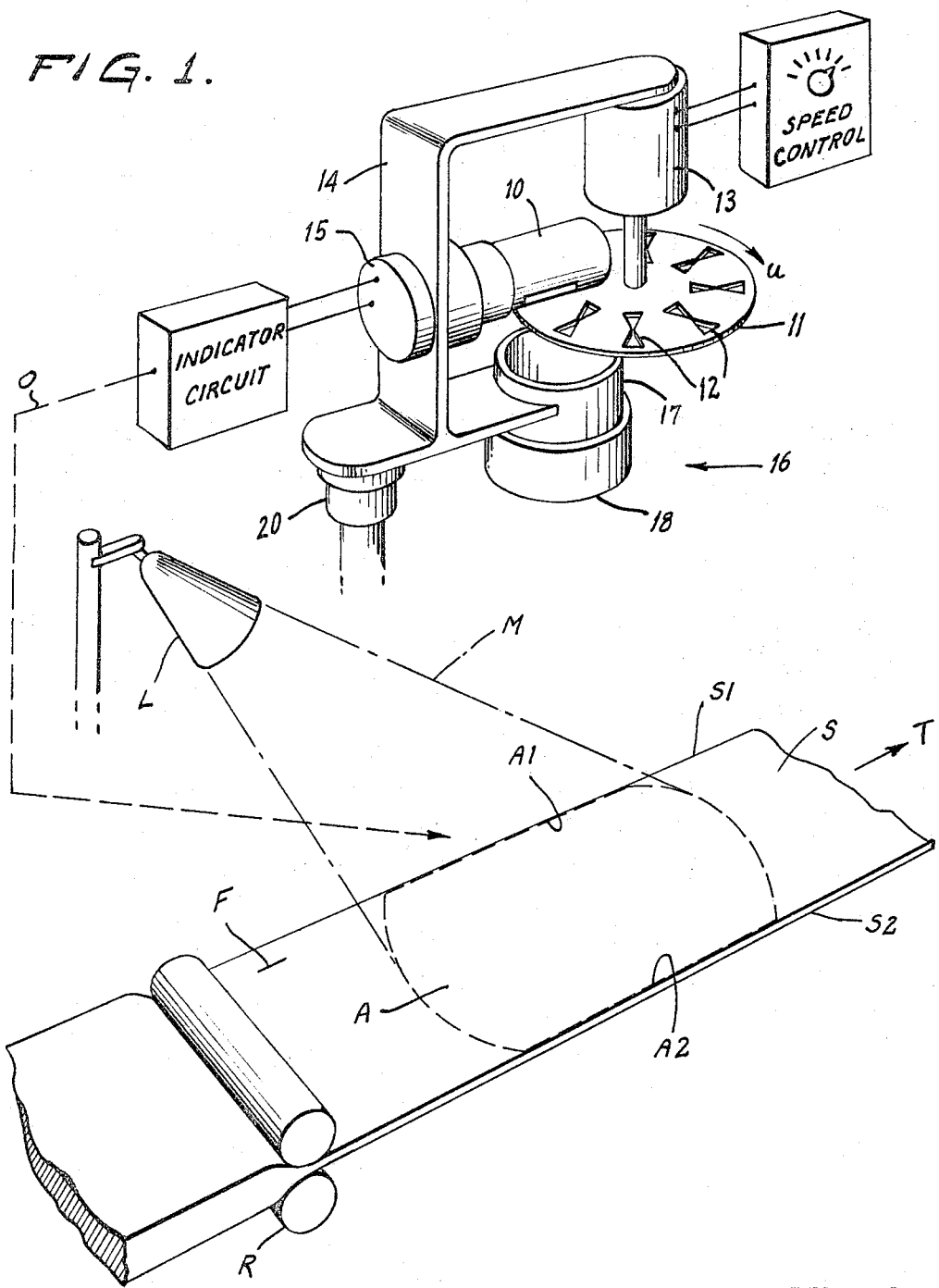

In FIGURE 1 the invention is shown as applied to the fabrication of a rolled strip S, which may consist for instance of steel or glass or celluloid. The material of the strip is formed by and between rollers R which are driven by suitable power means, not shown. The rollers move the formed strip horizontally through an illuminated area A, where the entire width of the strip, over a predetermined length thereof, is to be inspected in order to determine the possible presence of flaws F. In the illustrated system, inspection of this area is facilitated by a lamp L which directs a light beam M onto said area. The angle, intensity and color of illumination are desirably chosen so as to highlight the visible veins, or scratches, or other flaws F, to be detected in or on the rolled material. When the strip is transparent or translucent, it is often preferable to place a light source below the same; however, it is believed unnecessary to show this modified arrangement.

The rolling process is usually conducted in order to cause thinning of the strip, or longitudinal stretching thereof, or both. For this purpose, compression is imparted to the strip by the rollers, which are associated with suitable spring or weight loaded pressure means (not shown). Flaws of the rolled and stretched material are generally elongated, in direction T in which the strip is rolled. This direction, of course, is parallel to the sides S1, S2 of the strip, which coincide with sides A1, A2 of the inspection area.

Figure 4:
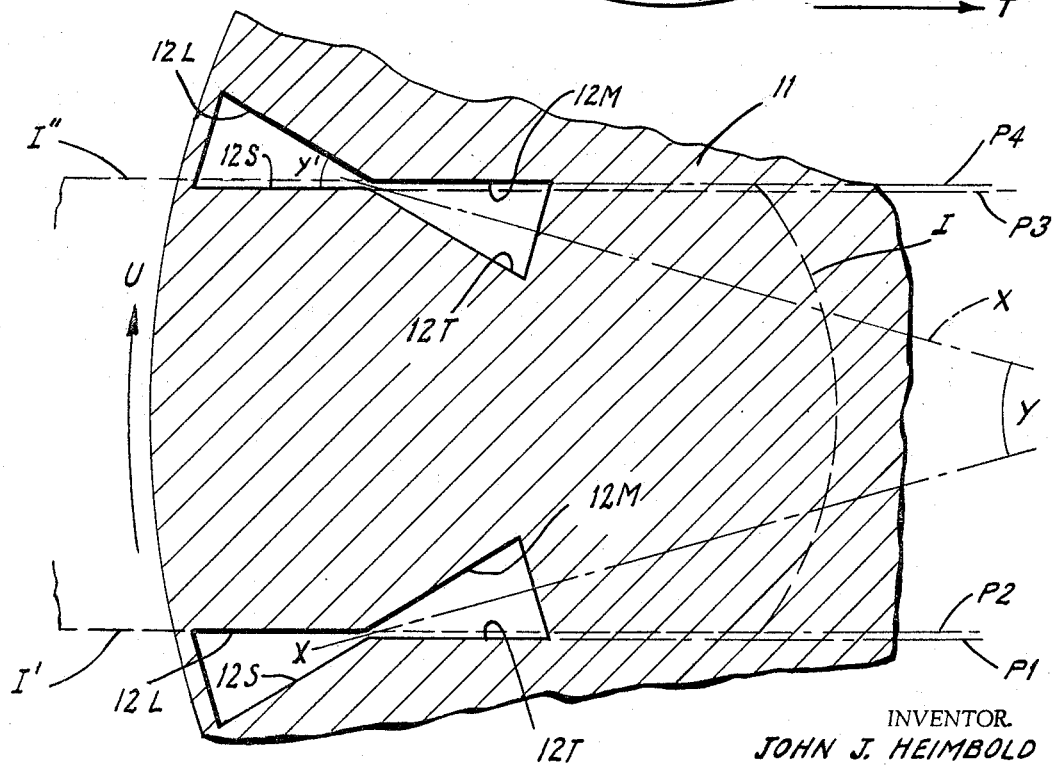
FIGURE 4 is a generally similar view showing central parts of the apparatus in a different operative position and on a still more enlarged scale.

The strip traversing the inspection area is observed by photocell 10 through scanning disc 11, which in accordance with the invention has specially formed apertures 12 therein. Each aperture (as best shown in FIGURE 4) constitutes a symmetrical pair of isosceles triangles with intersecting apex portions. The so-defined shape can be compared with that of an hourglass, and especially a narrow hourglass.

In order to drive disc 11 and thus to obtain the peculiar scanning of flaws F by apertures 12, a motor 13 is mounted on a suitable bracket 14; and this bracket is shown in FIGURE 1 as also supporting socket 15 of photocell 10, above the disc. Additionally the bracket supports an optical system 16, below the disc, for the inspection of area A.

Figure 2:
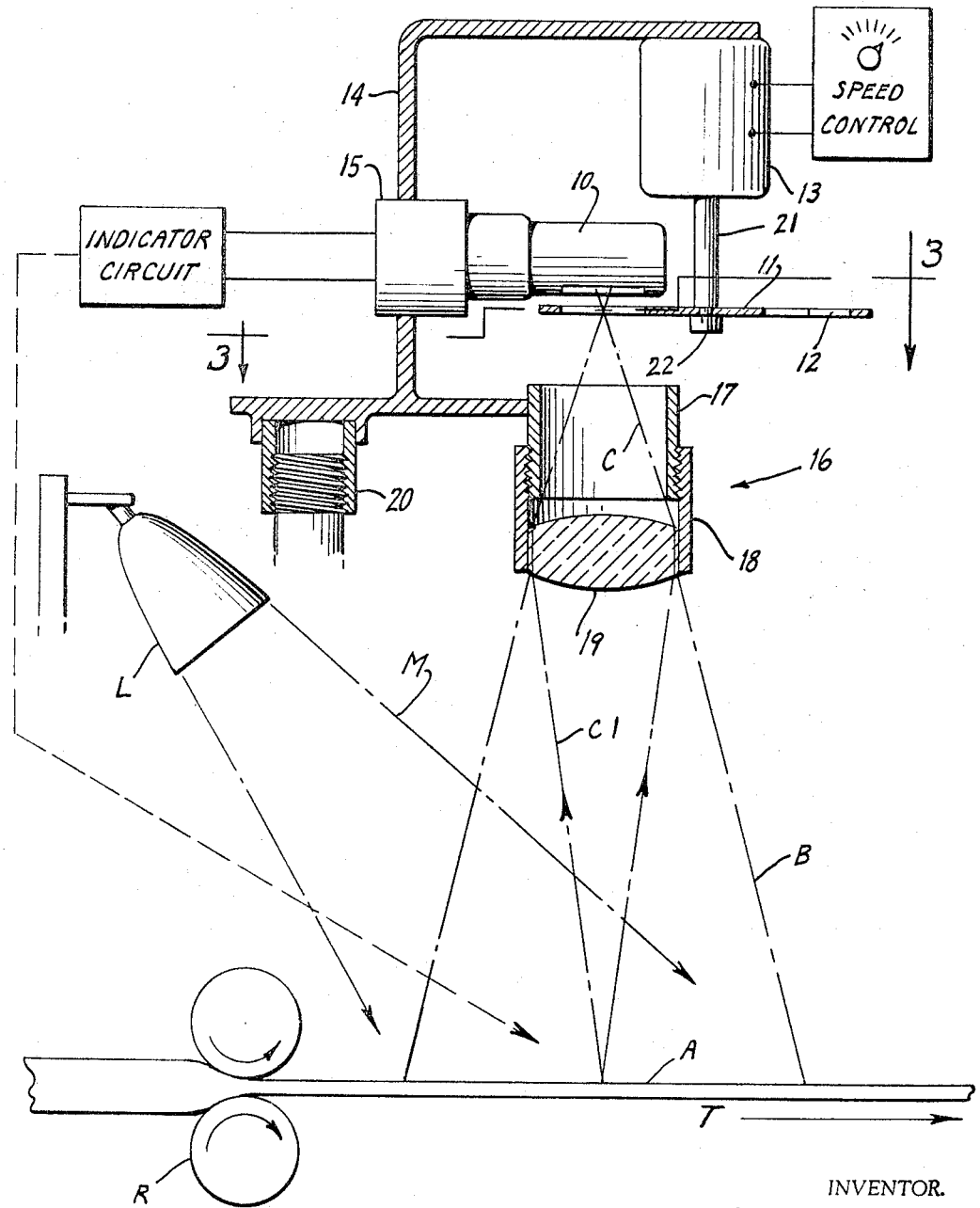
FIGURE 2 is a side view showing the same embodiment on a larger scale, and partly in vertical central section.

Optical system 16 is best shown in FIGURE 2. Desirably it comprises a stationary vertical tube 17, held by bracket 14 and adjustably supporting a sleeve 18, for instance by means of screw threads, the sleeve having a lens 19 mounted therein. The sleeve is adjusted so that the lens receives light B from the entire inspection area A, and that the lens is upwardly focussed onto the plane of scanning apertures 12 in overlying disc 11, as indicated by lines C. In downward direction (line C1) the lens is focussed on area A by suitable setting of a support 20 for bracket 14. When focussed in these ways, the optical system provides exact comparison between the size of flaws F and the area of apertures 12 within the field of vision, defined by sleeves 17, 18, thereby controlling the electric output of the photocell, as will now be explained.

Successive portions of rolled strip S, with or without flaws, are inspected as the strip is being rolled; in this way the rolling process itself supplies a first and rectilinear scanning motion T. Meanwhile a suitable disc 11, interchangeably secured to motor shaft 21 by fastener 22, rotates between the stationary optical elements 16.

Figure 3:
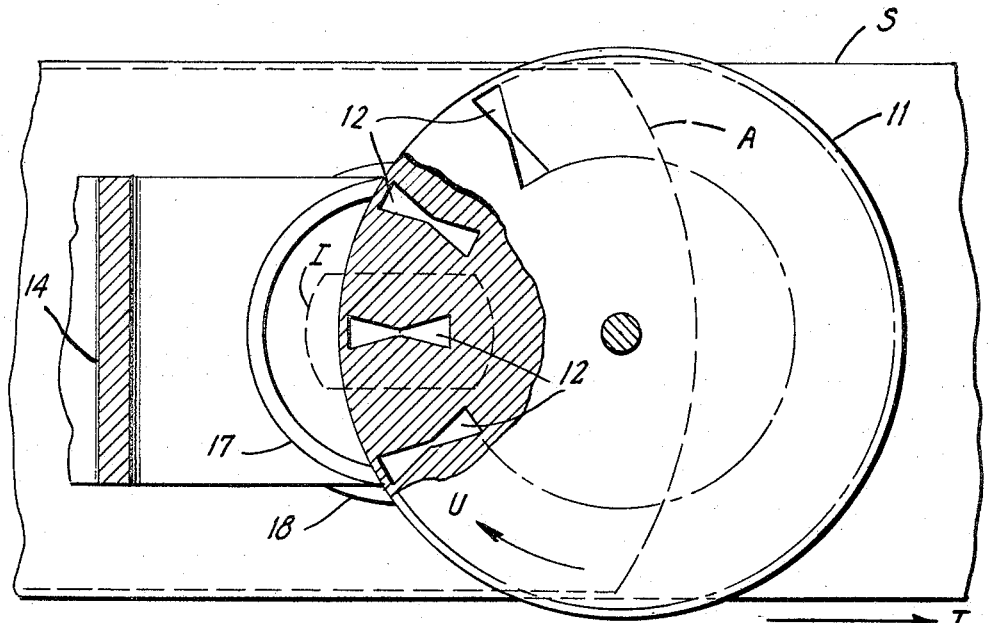
FIGURE 3 is a plan view taken at the levels indicated by lines 3—3 in FIGURE 2, and drawn on a more enlarged scale.

10. It rotates in traverse direction U, as best shown in FIGURE 3. An arcuate, transverse scanning motion is provided by this rotation, thus allowing inspection of strip materials of more or less extended width.

Flaw images, if any, pass along the image field in directions parallel to its sides, and are observed through scanning apertures 12, which partake of the transverse motion of the disc. Successive apertures 12, 12, 12, all having the peculiar hourglass shape, arcuately traverse the field of the optical system, wherein an image I of underlying inspection area A is formed.

Important features of this new scanning operation are indicated in FIGURES 4 to 6. When a flaw appears centrally of the inspection area, that is, at equal distances from the sides of this area, a flaw image F1 appears in a similarly centered portion of image field I (FIGURE 5). In other cases (FIGURE 6) a flaw image F2 appears nearer to one side of the field. In both cases a flaw signal appears in the electric output of the photocell, when a scanning aperture intercepts the flaw image. Electron noise also appears in the output.

It is desired to make the flaw signal clear and distinctive over the various noises, including the electron noise, even if the optical contrast, provided by a flaw, be small. Of course this desired distinctiveness of the flaw is promoted to some extent by keeping the suroundings of the inspection area and image field dark, for instance by a conventional, optical aperture stop (not shown). By virtue of the invention the contrast is further heightened, in significant degree, as a result of the new shape and arrangement of apertures 12. The hourglass shape of the apertures provides a uniform maximum of signal amplitude, regardless of whether a flaw appears centrally of the strip (FIGURE 5) or marginally thereof (FIGURE 6). By proper narrowness and spacing, the new apertures also insure a minimum of noise output.

Some of these effects, significant mainly for this minimum of noise output, can best be explained with reference to FIGURE 4. As shown in this figure, each aperture has a pair of sides 12L, 12M which are in leading position with respect to the direction of disc rotation U, and a pair of trailing sides 12S, 12T. An outer portion of each aperture, adjacent the edge of the shutter disc, is defined by equal sides 12L, 12S, and an inner portion is defined by equal sides 12M, 12T. These inner and outer aperture portions are bisected by center lines X, constituting radii of the disc, and the triangles are equal; therefore sides 12L, 12T of each aperture are parallel one to the other (see lines P1, P2), and similarly sides 12S, 12M of each aperture are parallel to one another (see lines P3, P4). The angular spacing Y between center lines X equals the apex angles Y' of the apertures, so that the inner trailing side 12T of a trailing aperture (line P1) is parallel to the outer trailing side 12S of an adjacent leading aperture (line P3).

This last feature can also be stated by saying that the outer leading side 12L of an aperture and the inner leading side 12M of an adjacent aperture are in parallel orientation (P2, P4). Further, and importantly, the image of the inspection area is such that the width I'–I'' of the image field equals the distance (P2–P4) between such sides.

As a result of these ararngements the image field I always contains either one aperture (FIGURES 3, 5) or an aperture area equal to that of one aperture and provided by portions of two apertures (FIGURES 4, 6). On uniform illumination of the inspection area, uniform amounts of light are thus received in the photocell, in the absence of flaws, regardless of whether or how rapidly the shutter disc may rotate over the image field. This uniform illumination causes a noise output N (FIGURES 5 and 6) having uniform amplitude NA.

The described arrangement also provides an interception of flaw images which in important respects is uniformly effective, regardless of whether a flaw image appears in a central region (FIGURE 5, shaded area) or in a marginal region of the image field (FIGURE 6, shaded area). In both cases the hourglass aperture intercepts the full area of the flaw image. By virtue of this expedient the resulting signal output has equal strength or amplitude in both cases, and because of the uniform exposure of aperture areas this signal amplitude is impressed on a uniformly controlled amplitude of shot noise.

The amplitude NA of shot noise N (FIGURE 5) is kept small by minimizing the light reaching the photocell and by therefore making apertures 12 slender, that is, making these apertures in form of narrow hourglasses. To this extent, the aperture areas are limited; however, the apertures are made relatively long in directions radially of disc 11 (shown at X in FIGURE 4). The object of this feature is to cover substantial portions of image field I, and thus to detect any defect of the rolled material without undue rotary speed of the scanning disc (which would introduce problems of non-linearity between photocell input and output, aside from disc vibration and related dangers).

The steady, residual noise N can be filtered out by simple circuit means, not shown, which form part of an indicator circuit in the photocell output (FIGURE 1). By contrast, if the noise level were allowed to vary, by different spacing of apertures 12, and if illumination were thus applied to the photocell in form of consecutive pulses, it would become much more difficult to recognize the photoelectric signals signifying the presence of a flaw. For instance it would then become hard to distinguish such signals from the start or end portions of pulses of illumination.

Further and more detailed consideration can now be given to the output signals, caused by elongate flaws of the rolled material and controlled by the hourglass shape of the shutter apertures.

FIGURE 5 shows consecutive positions of an hourglass aperture, including position 121 where the aperture area is about to intercept flaw image F1, centrally between sides I', I''. As the aperture moves in direction U from this position toward increasing interception of the flaw image, a flaw signal begins to appear in the photocell output (see left-hand portion of curve FS). As scanning rotation U causes gradually greater interception of the flaw by the aperture, the amplitude of the signal increases gradually to a maximum. The shot noise remains superimposed thereon (see the curved portions of the upper and lower broken lines. The continuing motion T of the strip and flaw image will be temporarily disregarded at this point.) The signal reaches its maximum as the aperture reaches the central location 122 (see the diagrammatically shaded area). At this location the aperture intercepts the entire flaw and causes the photocell to observe a maximum of light effect provided by the flaw. Thereafter the signal decreases gradually as a position 123 is reached where the aperture leaves the flaw. A flaw centrally located on the rolled strip thus causes a gradually rising and falling output signal FS as shown.

Considering next the effect of flaw images which are shorter, or thinner, or less contrasting than image F1, or which move relatively rapidly through the center of the image field: it will be clear from the explanations given up to this point that such images produce smaller signals than FS, but usually of more or less similar form. In order to adapt the instrument to the detection of different types of flaw phenomena, it is preferred to utilize interchangeable shutter discs. In many cases it is well for instance to proportion the length of apertures 12 to the average length of flaws to be detected. It is, however, not necessary to use different apertures for the adequate detection of flaws differently located on strip S.

This latter point is explained by FIGURE 6. A flaw is here assumed to occur in the vicinity of the side edge of the rolled strip, not in the center as in FIGURE 5. It produces flaw image F2 in a marginal region of field I.

For simplicity of explanation it is assumed that in both cases (FIGURES 5 and 6) the flaw images F1, F2 are otherwise identical in nature, dimensions, and motion. In the case of FIGURE 6 the flaw image is intercepted by an hourglass aperture moving through positions 124, 125, 126, 127. By virtue of the hourglass shape of the scanning aperture, the amount of signalling illumination received in the photocell, due to the flaw, reaches substantially the same amplitude in both cases, as is indicated by the substantially equal height of signal curves FS, FS6. The reason is that momentarily, the entire flaw is fully intercepted by the aperture in both cases (122, 125). By virtue of the hourglass shape this full interception occurs in all cases, regardless of whether the flaw, at full interception, is parallel to the axis of the new scanning aperture (as in 122) or to its side (as in 125). The signal thus reaches the same maximum amplitude in FIGURE 6 as in FIGURE 5. The only difference between the two cases is that curve FS6 in FIGURE 6 is less symmetrical than FS in FIGURE 5, as the geometry of motion is not the same in both cases. Due to greater obliquity relative to the flaw, the initial phase 124–125 of flaw interception is likely to last longer than the final phase 125–126. Importantly, however, the amplitudes of signals FS, FS6 are equal in the photoelectric operations represented by FIGURES 5 and 6 respectively.

The situation is substantially different when conventional scanning apertures are used. Flaw signals of greatly varying amplitudes are then produced. This will be understood better when thought is given to the effect of long, conventional apertures of rectangular form, as analyzed in FIGURES 7 and 8. In the interest of correct and meaningful comparison it has been assumed that image field I is the same as in FIGURES 5 and 6 and that the same flaws, designated respectively as F1, F2, are to be detected. Similarly it has been assumed that the conventional apertures have the same angular spacing and total area as the hourglass apertures 12 provided in accordance with the invention, thereby introducing substantially the same amplitude of shot noise N in all cases. On consideration of the aperture motion 221, 222, 223 in FIGURE 7 it will be seen that a central flaw F1 produces a signal curve FS7 of the same amplitude as was shown at FS (FIGURE 5), although with different slope and "crispness." However, consideration of the aperture motion 224, 225, 226, 227 illustrated in FIGURE 8 will show that a much less favorable situation exists when a marginal flaw signal F2 is to be detected through a conventional rectangular aperture. As this rectangular aperture passes through the successive positions of initial, maximum and final interception of the flaw, the long sides of the aperture are never parallel with the flaw and the entire aperture never quite intercepts the flaw, since the arcuate scanning motion U then necessarily involves obliquity of the relatively narrow aperture, relative to the flaw.

The result is that signal FS8, produced by marginal flaw F2 through conventional rectangular aperture 225, has considerably smaller amplitude (although longer duration) than any of signals FS, FS6 or FS7 considered thus far. In the case of FIGURE 8, accordingly, the unavoidable shot noise N is much more likely to obscure or disturb the flaw signal than in the other cases (FIGURES 5, 6, etc.).

Nothing is gained by using a conventional rectangular aperture which is wider, or for instance square. This will be understood from consideration of FIGURE 9. The figure shows flaw F partly intercepted by a square aperture moving through positions 321, 322, 323 and having approximately the same area as the hourglass aperture of FIGURES 5 and 6 and the rectangular apertures of FIGURES 7 and 8. The noise amplitude N is the same as before, but the system produces a flaw signal FS9 of less amplitude than FS (although of longer duration) and which is correspondingly harder to discriminate from the shot noise.

In addition, this square and non-elongated aperture has a disadvantage when it must intercept relatively short flaws; all of these can be intercepted only by a relatively rapid scanning motion of the disc having a short, square aperture. This leads to certain further problems, which have already been mentioned.

The signal to noise ratio is even worse when another conventional system is used, wherein square aperture 324 is larger than 322 and encompasses the entire flaw F. The signal amplitude is then increased only in proportion to the side length of the square, while the noise amplitude is increased in proportion to its area, that is, in proportion to the square of the side length. On the other hand, the interception of flaws of limited length is very unsatisfactory if a conventional square aperture 325 is used which is still smaller than 322.

Thus it is clear that an exceptionally favorable signal to noise ratio is obtained by the new system characterized by the hourglass apertures, and that such ratio cannot be matched by the conventional apertures considered herein, regardless of size and proportions thereof. For similar reasons the new arrangement is superior to the use of circular apertures, which of course are known from other conventional scanning means.

The new and improved signalling can be used whenever it is desired to obtain a response to elongate flaws or the like, for instance to count such flaws by means of an Indicator Circuit (FIGURE 1) or to mark their position on strips by some output mechanism O of such a circuit. The new instrument is applicable to a wide variety of photoelectrical determinations, including not only the detection of scratches on sheet material and the location of veins in such material, but more broadly the observation of any type of elongate marks or other elongate objects, moving relative to the instrument in a direction parallel to such objects. Therefore, while only a single embodiment of the invention has been described, the details thereof are not to be construed as limitative of the invention. The invention can be practiced without the use of the optical imaging system. In such case it would only be necessary that the disc be large as compared with the width of the strip under inspection and that it be relatively close to the strip. It will be understood, however, that the invention contemplates such variations and modifications as come within the scope of the appended claims.

I claim:

1. As a system for observing elongated and substantially parallel areas or objects lying generally in a common plane: an assembly comprising a photocell and a shutter for the same, said shutter including apertures of generally hourglass shape defined by sides comprising substantially straight line segments; and means for effecting relative movement between said assembly and said objects in a direction generally parallel to the plane of said objects and to move said apertures transversely of the length of said objects and in a direction transverse to the length of said apertures.

2. In a system for observing elongated, parallel, travelling objects: a photocell, a shutter disc for the same having apertures of generally hourglass shape in which each side of the hourglass comprises two substantially straight line segments, and means for rotating the shutter disc to translate said apertures in directions including a direction across said objects, to expose the entire length of each successive object through each successive aperture, in mutual orientations generally longitudinal of the object and aperture, to the photocell.

3. In apparatus for observing elongated parallel objects moving in a direction parallel to their length: a disc including elongated apertures which angularly expand from a narrow center portion in two opposite directions, the apertures having sides formed by substantially straight lines, mutually aligned in hourglass fashion and having longitudinal axes which extend generally radially of the disc; means for rotating the disc to cause relative motion of the elongated objects and apertures while maintaining generally similar orientations of their length dimensions except for the angular mutual displacement of said dimensions caused by said rotating of the disc; and a photocell for observing the moving objects through said apertures of the rotating disc.

4. In apparatus for detecting or counting elongate markings and the like: a phototube and a rotatable shutter for the same, said shutter including apertures distributed about the same which have substantially the form of straight-sided hourglasses and which are arranged to expose said markings to said phototube with the length of each marking extending generally along the length of each aperture.

5. In apparatus for scanning a longitudinally moving strip for longitudinal marks: a rotatable scanning disc having at least a portion of the disc overlying an area of the strip, said disc having apertures formed like straight-sided hourglasses and which are arranged to pass arcuately over said area as the disc rotates.

6. An instrument for observing longitudinal marks of a longitudinally moving object, said instrument comprising means for forming images of said marks in an image plane; a shutter rotatable in said plane and including apertures which have the form of relatively narrow and substantially straight-sided hourglasses; means for rotating said shutter to translate said hourglasses transversely of their length and of the length of said images; and a photocell facing said plane to observe said images and apertures.

7. Apparatus for observing material-rolling processes and the like to detect elongated markings and flaws of the material, said apparatus comprising a photo-responsive transducer and a rotatable shutter for the same, said shutter having apertures distributed thereover which have substantially the form of straight-sided hourglasses with axes radially disposed on the shutter.

8. Instrument for detecting elongate longitudinal flaws of a rolled strip, said instrument comprising a photocell; a flat shutter disc for the same, said shutter disc having apertures uniformly distributed thereover and radially disposed thereon which have the general form of narrow straight-sided hourglasses; means to rotate the disc; and means for imaging said flaws in said apertures, substantially in the plane of said disc, for observation by said photocell.

9. Apparatus as described in claim 8, also including means for removing said shutter disc and replacing it by a flat shutter disc with differently dimensioned, differently arranged apertures, having the general form of narrow straight-sided hourglasses, for detecting different flaws.

10. In a unit for observing moving elongated objects, such as scratches on rolled sheeting, by a photocell, the improvement which comprises a rotatable shutter for the photocell, with apertures peripherally distributed about the shutter, each aperture having the general shape of a pair of isosceles triangles with apex portions intersecting one another.

11. In a unit for observing elongated longitudinally moving objects, the improvement which comprises a rotatable photocell shutter with apertures peripherally distributed about the shutter, each aperture comprising a pair of isosceles triangles which have apex portions intersecting one another and are substantially bisected by radii of the shutter.

12. In a unit for observing elongated longitudinally moving objects, the improvement which comprises a rotatable photocell shutter disc with apertures peripherally spaced about the disc by generally uniform angles, each aperture constituting a pair of isosceles triangles with apex angles substantially equal to said aperture-spacing angles and with apex portions intersecting one another.

13. In a unit for observing elongated longitudinally moving objects, the improvement which comprises a rotatable photocell shutter disc with apertures peripherally spaced about the disc by generally uniform angles, each aperture constituting a pair of isosceles triangles with apex angles substantially equal to said aperture-spacing angles, and with apex portions intersecting one another and substantially bisected by radii of the disc.

References Cited
UNITED STATES PATENTS

| | | | |
|---|---|---|---|
| 2,783,389 | 2/1957 | Cummings et al. | 250—233 X |
| 3,257,563 | 6/1966 | Laurent | 250—219 |

RALPH G. NILSON, *Primary Examiner.*

M. A. LEAVITT, *Assistant Examiner.*